April 27, 1954     H. O. GODDARD     2,676,883
WASTE SULFITE LIQUOR RECOVERY

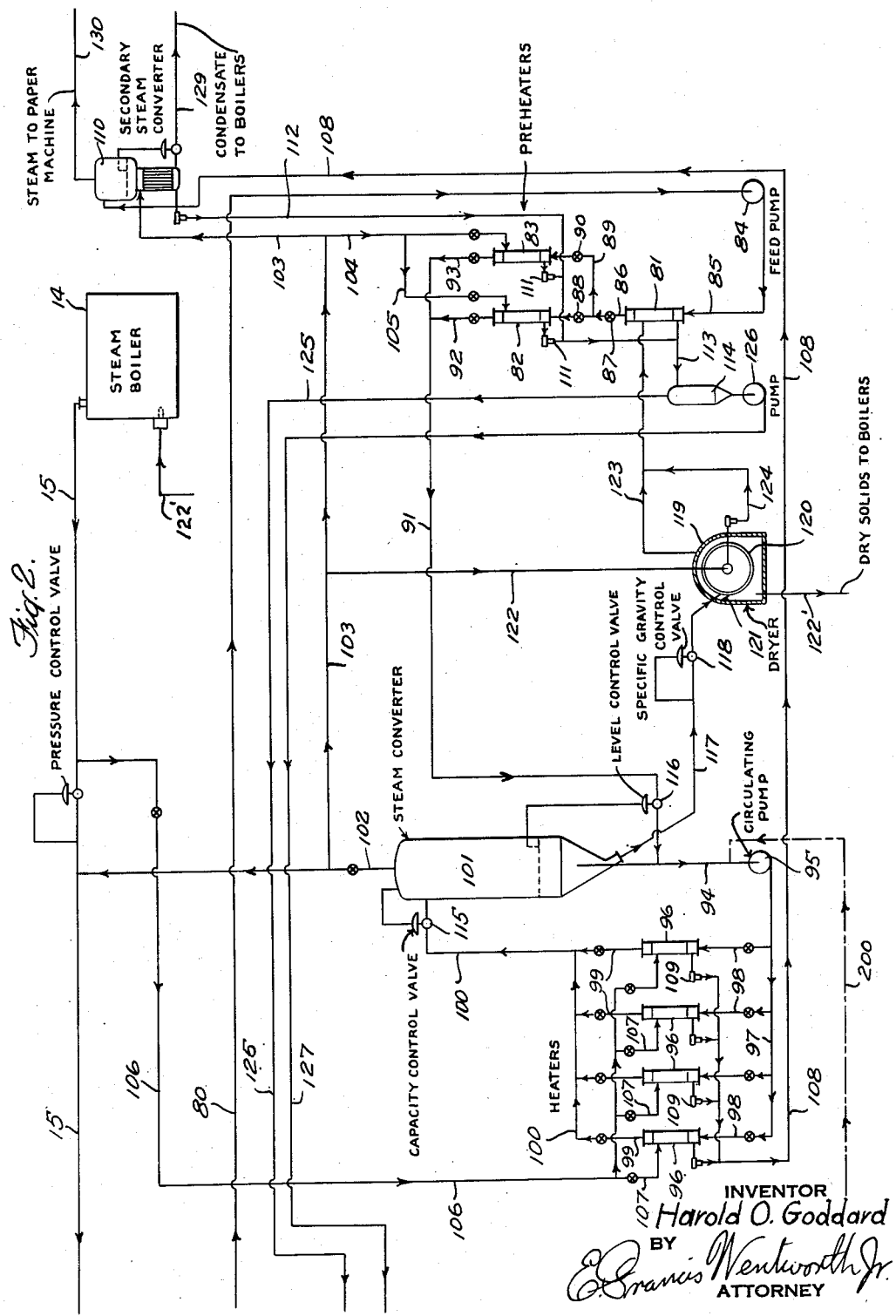

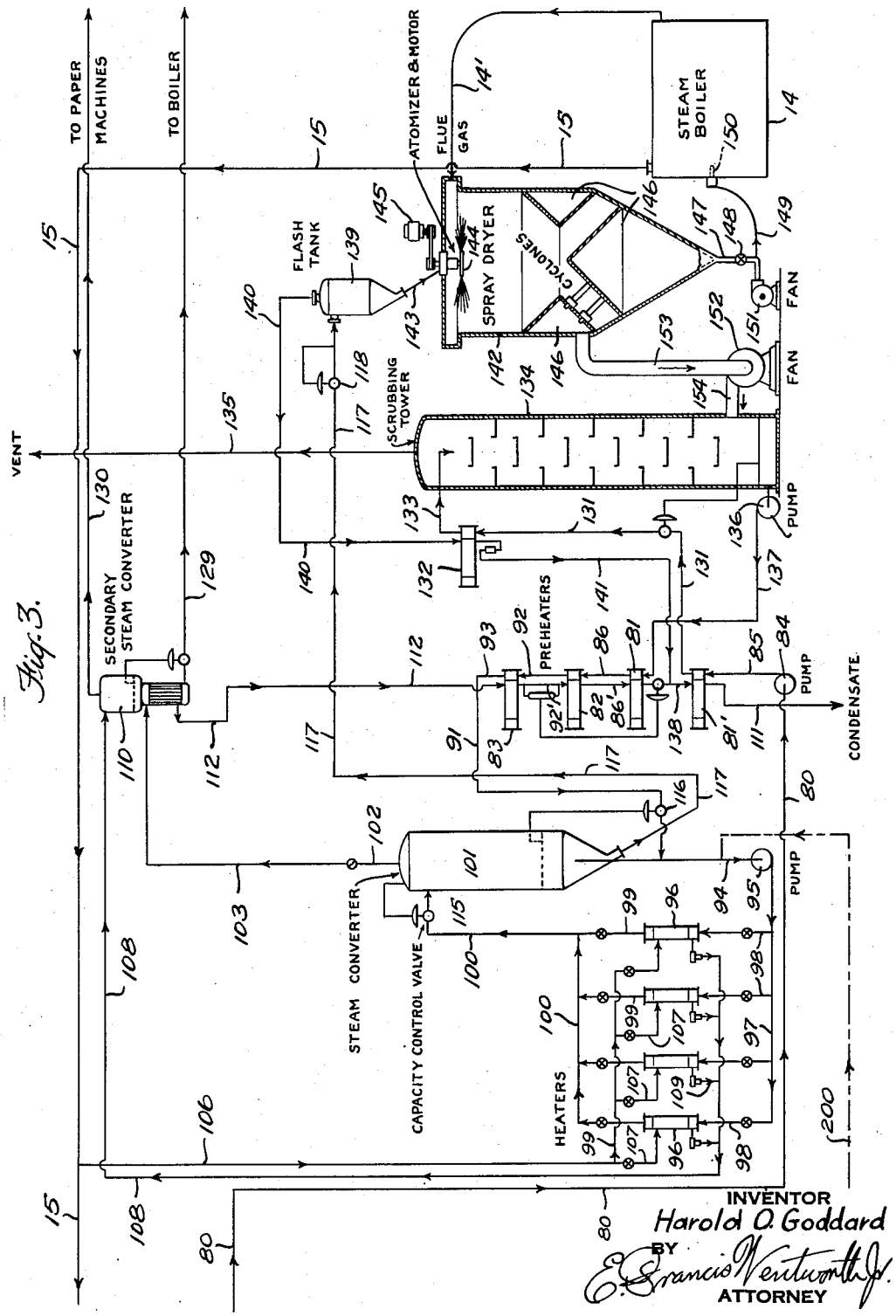

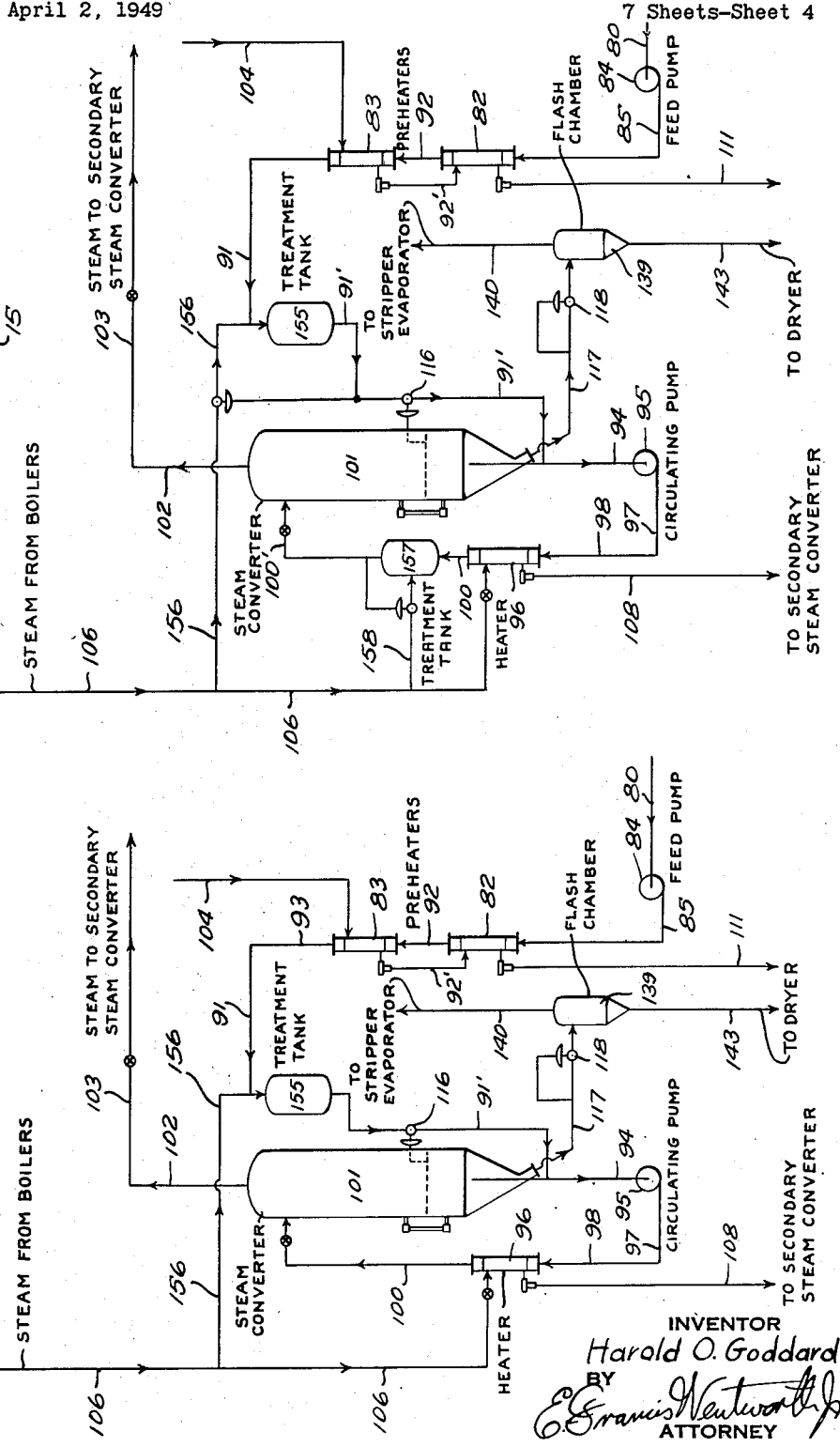

Filed April 2, 1949     7 Sheets-Sheet 5

INVENTOR
Harold O. Goddard
BY
E. Francis Wentworth Jr.
ATTORNEY

April 27, 1954     H. O. GODDARD     2,676,883
WASTE SULFITE LIQUOR RECOVERY
Filed April 2, 1949     7 Sheets-Sheet 6
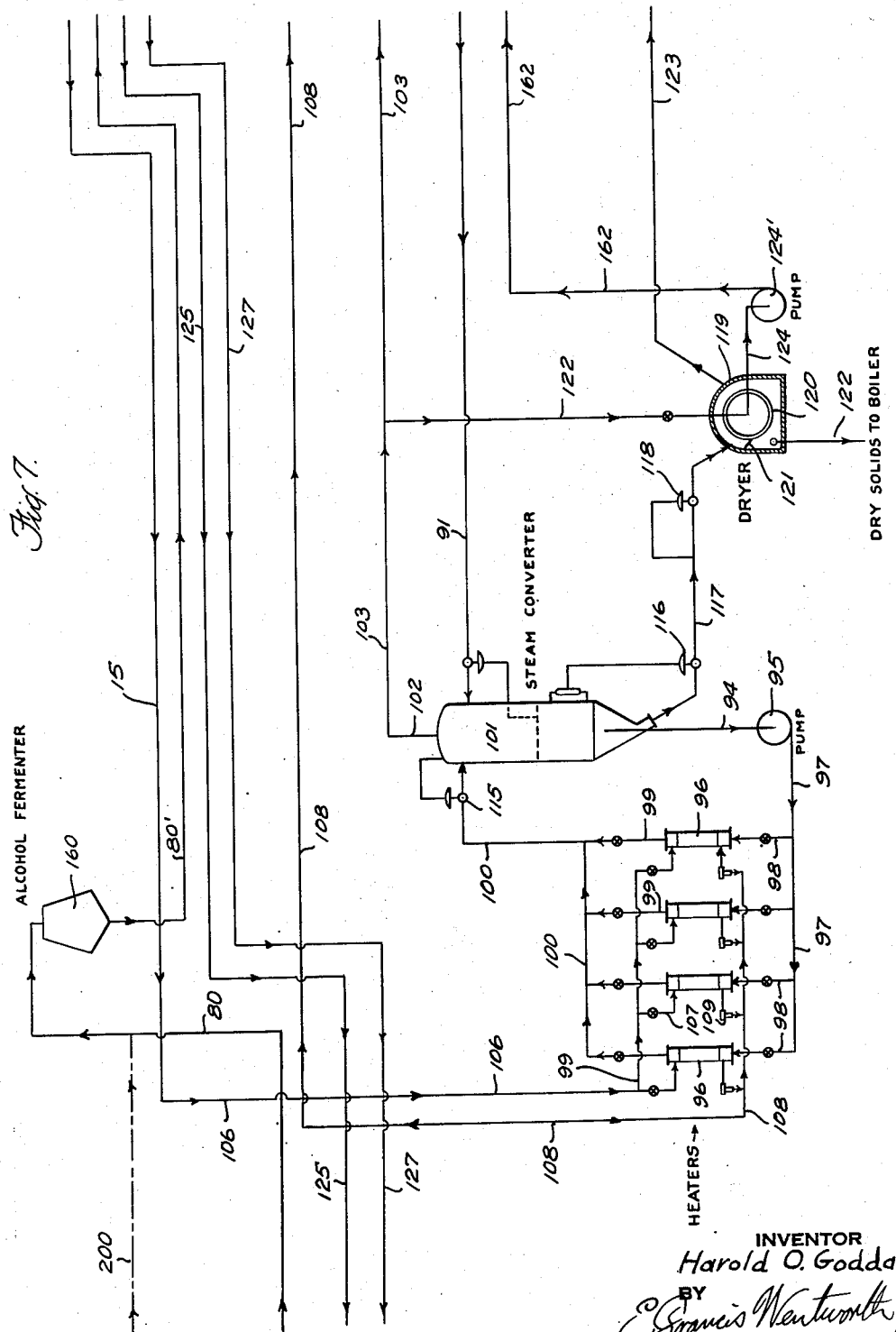
INVENTOR
Harold O. Goddard
BY
ATTORNEY

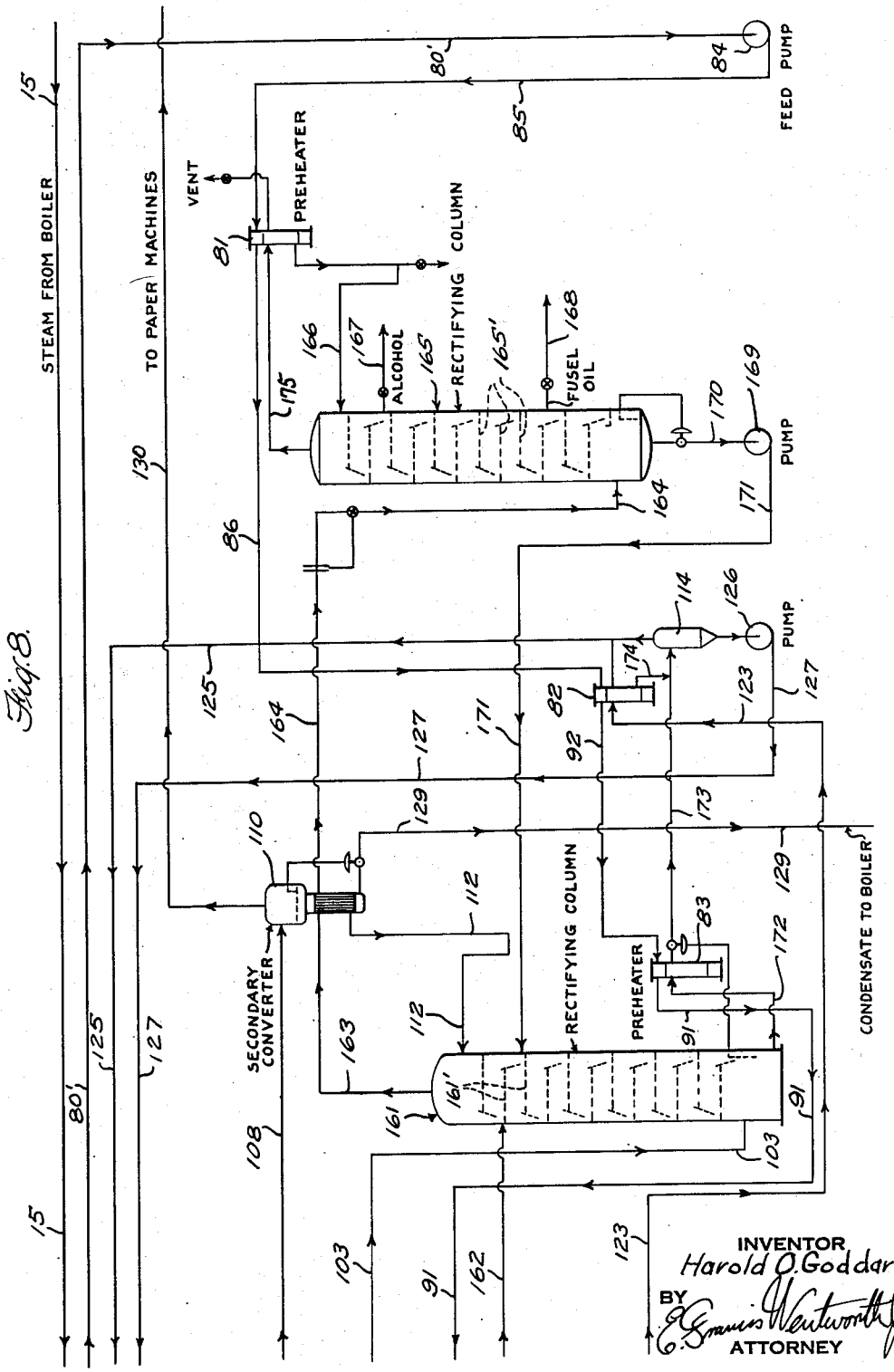

Patented Apr. 27, 1954

2,676,883

UNITED STATES PATENT OFFICE 2,676,883

WASTE SULFITE LIQUOR RECOVERY

Harold O. Goddard, St. Catharines, Ontario, Canada

Application April 2, 1949, Serial No. 85,116

9 Claims. (Cl. 92—2)

1

This invention relates to the recovery of useful products from waste sulphite liquor discharged by sulphite pulp plants.

Heretofore, numerous products have been recovered from waste sulphite liquor. For example, the sugars therein have been recovered and used in the production of alcohol. Sulphur dioxide gas and sulphites have been recovered from said liquor. Waste sulphite liquor has also been concentrated or dried and the liquor in concentrated or dried form has been burned. While prior recovery methods of which I am aware have been to some degree successful in accomplishing their purposes, they have not been economic in their functioning nor have they been trouble-free in their operation.

The present invention provides a method of and apparatus for the recovery of useful products from waste sulphite liquor in which said products are economically recovered.

This invention also provides a method of and apparatus for concentrating waste sulphite liquor wherein a minimum of steam is used and a minimum of scaling of the concentrating apparatus occurs.

A method of and apparatus for producing a finely divided dried solid fuel useful, for example, as a fuel in a steam generator, is also provided by the present invention.

This invention also provides a waste sulphite liquor conversion method, and apparatus in which the sugars contained in waste sulphite liquor are economically converted into alcohol and in which the sugar denuded liquor is concentrated and dried.

In accordance with the present invention, steam for use in the operation of a sulphite pulp plant is generated to a pressure higher than that required for the operation of the digesters, paper machine dryers, or other steam consumers in said plant, and at the higher pressure is used to concentrate and to dry the waste sulphite liquor into a form which is usable as a fuel in a steam generator. The dry solids from the concentrated and dried waste sulphite liquor, which contain approximately 8,000 B. t. u. per pound of dry solids, are produced, in accordance with the present invention, in a finely divided state and may readily be substituted for pulverized coal to fire said steam generator. The steam, after use in concentrating and drying the waste sulphite liquor, is then used, at its reduced pressure, to operate the above-mentioned steam consumers of the sulphite pulp plant. By borrowing steam between the plant steam generator and the plant steam consumers, the waste sulphite liquor conversion is accomplished with a minimum of steam loss in evaporation.

Should it be desired to recover products other than dry, finely divided solids from the waste sulphite liquor, this may also be done by the method and apparatus of the present invention. For example, waste sulphite liquor, after it has been concentrated and the sulphur dioxide gas has been removed therefrom, is passed to apparatus for converting the sugars in the waste sulphite liquor to alcohol, the water and alcohol being evaporated from the waste sulphite liquor solids by steam from the plant steam generator. The heat of the alcohol and water vapors is used to rectify the alcohol prior to conversion of said heat to usable steam in the steam consumers. The alcohol denuded liquor is concentrated and dried so that the above-mentioned finely divided dried product may be secured. A small alcohol plant which is economical in operation is thereby provided and a finely divided dried product usable for fuel is obtained.

The invention will be understood from the following description when considered in connection with the accompanying drawings forming a part thereof and in which:

Fig. 2 is a continuation of the diagrammatic view shown in Fig. 1;

Fig. 3 is a diagrammatic view of another embodiment of the portion of the invention shown in Fig. 2;

Fig. 4 is a diagrammatic view of an embodiment of the invention wherein waste sulphite liquor is treated with steam to prevent scaling of the evaporating apparatus;

Fig. 5 is a view similar to Fig. 4 but of another embodiment of the invention;

Fig. 7 is a partial view similar to Fig. 2 but showing an embodiment of the invention wherein alcohol is recovered from waste sulphite liquor, and Fig. 8 is a continuation of the view shown in Fig. 7.

Like characters of reference refer to the same or to similar parts throughout the views.

Figure 1:
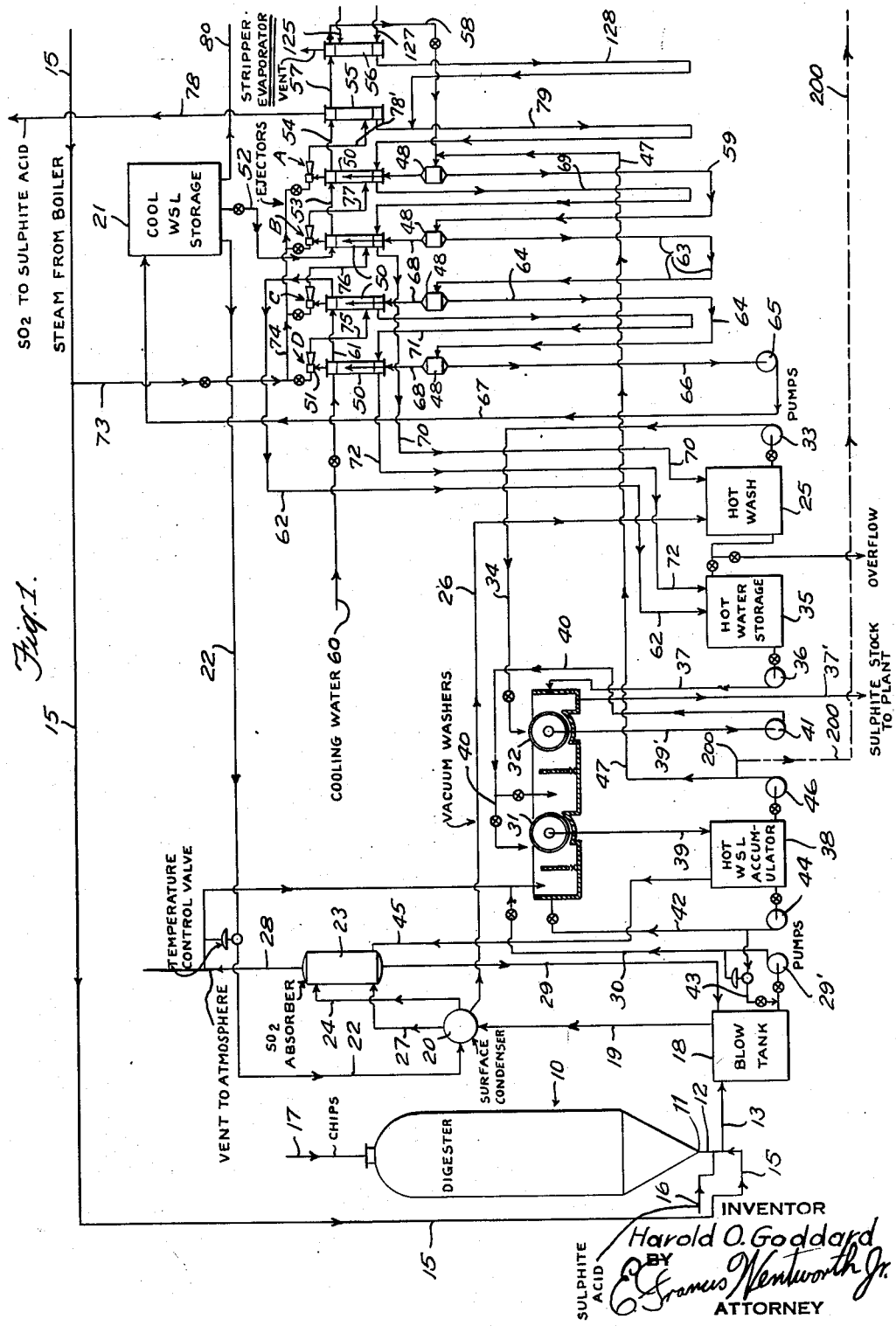
Fig. 1 is a diagrammatic view of an arrangement of a portion of the apparatus of the present invention.

Referring to Fig. 1 of the drawings, the reference numeral 10 designates a digester of conventional construction which discharges through the bottom 11 thereof into a pipe 12 communicating with a discharge conduit 13. Steam for heating the contents of the digester to cooking temperature is conducted thereto from a steam generator shown diagrammatically at 14 (Fig. 2) through steam line 15 and pipe 12 while sulphite acid used in the digester is introduced at the bottom thereof through pipes 16 and 12. Chips are conducted into the top of the digester through a conduit 17.

As is usual in the operation of such a digester, at the start of each batch the digester 10 is loaded with wood chips conducted thereinto through conduit 17 and filled with sulphite acid which enters the digester through pipes 16 and 12. The charge of wood chips and sulphite acid is then cooked by steam conducted to the digester through lines 15 and 12. Upon completion of the cooking operation, the contents are discharged from digester 10 into blow tank 18 through line 12 and discharge conduit 13.

Gases ($SO_2$) flashed off during blow-down are vented from blow tank or pit 18 through gas line 19 into a surface condenser 20 wherein vapor in the gas is condensed by flowing in contact with surface cooled by cool waste sulphite liquor collected in a storage tank 21 during operation of the present invention as hereinafter described. The cool waste sulphite liquor is conducted to condenser 20 through line 22 and, after condensing vapor in the $SO_2$ gas and becoming heated by passing in heat exchange relationship with said gas, is passed to the upper part of an absorber 23 through conduit 24. Condensate from condenser 20 flows to hot wash container 25 through line 26 while the $SO_2$ gas, after the vapor has been removed therefrom, is passed to the lower part of absorber 23 through gas line 27. Gases flowing into absorber 23 through gas line 27 are absorbed by waste sulphite liquor flowing into the absorber through conduit 24. Any unabsorbed gases are vented to the atmosphere from the absorber through outlet 28. The waste sulphite liquor, after absorbing $SO_2$ in the absorber, flows to blow tank 18 through conduit 29 where it is mixed with the blown-down pulp from digester 10 to reduce the pulp consistency so that the same may be pumped from said tank. The temperature of the pulp and liquor in blow-tank 18 would normally be approximately 185° F. at which temperature the $SO_2$ therein would remain in solution.

The solution of pulp and waste sulphite liquor is pumped from blow tank 18 by pump 29' through line 30 into suitable pulp washing apparatus such as rotary vacuum filters 31 and 32 arranged in series. The washing apparatus would normally be designed to wash approximately 90% or more of the waste sulphite liquor from the pulp with a dilution of less than one pound of water per pound of pulp and at the same time discharge liquor at the temperature at which it was received, that is, approximately 185° F. The mixture entering the washing apparatus through conduit 30 is washed with a mixture of condensate from condenser 20, which is discharged into hot wash container 25 through conduit 26, and hot water received from the evaporating apparatus hereinafter described. The condensate and hot water mixture is pumped by pump 33 from container 25 through line 34 into the washing apparatus. Also hot water from water storage 35, which water is received from evaporating apparatus hereinafter described, is pumped into the washing apparatus by pump 36 through line 37. Washed pulp is removed from the washing apparatus through outlet conduit 37' while hot waste sulphite liquor is passed from washer 31 into hot waste sulphite accumulator 38 through line 39. Waste sulphite liquor from washer 32 is recirculated to the washer through recirculating lines 39' and 40 by recirculating pump 41. To maintain the proper pulp consistency in the washers and also in blow tank 18, a portion of the hot waste sulphite liquor from accumulator 38 is passed to the washers through line 42 and to the blow tank through lines 42 and 43 by circulating pump 44. $SO_2$ gas from accumulator 38 is conducted to absorber 23 through gas line 45 so that said gas will be scrubbed along with the gas entering absorber 23 through line 27.

Waste sulphite liquor from accumulator 38 is pumped by pump 46 through waste sulphite liquor conduit 47 to stripper evaporator apparatus where said waste sulphite liquor is evaporated, cooled, condensed, concentrated and stripped of $SO_2$ gas. Each stripper evaporator comprises a flash chamber and a condenser which are maintained under vacuum by means of a steam ejector.

The stripper evaporator, as shown in Fig. 1, consists of four stages of evaporation indicated at A, B, C, and D. Each stage comprises a flash chamber 48 and a condenser 50 both of which are maintained under vacuum by a steam ejector 51. Cooling medium for condensers 50 of stages A and B is provided from the cool waste sulphite liquor storage tank 21 and flows through said condensers serially, passing into condenser 50 of stage B in line 52. After flowing through condenser 50 of stage B, the waste sulphite liquor flows to condenser 50 of stage A by way of line 53 thereafter passing through said condenser and outwardly therefrom into pipe 54. Condensers 50 of stages D and C are supplied with a water cooling medium which enters condenser 50 of stage D through cool water conduit 60 and passes through said condensers serially, flowing from condenser 50 of stage D to condenser 50 of stage C through line 61 and from the condenser of stage C into hot water storage 35 through conduit 62. Hot water for use in the pulp washing apparatus, hereinbefore described, is thusly provided.

From pipe 54, the waste sulphite liquor is passed serially through condensers 55 and 56, said condensers communicating with one another through pipe 57. Waste sulphite liquor from condenser 56 flows to flash chamber 48 of stage A through conduit 58 while waste sulphite liquor from the hot waste sulphite liquor accumulator 38 flowing through conduit 47 also passes to said flash chamber. The hot waste sulphite liquor from accumulator 38 and from the condensers 50, 55, and 56 is cooled and concentrated by successively flashing it through flash chambers 48 of stages A, B, C, and D, the liquid from chamber 48 of stage A flowing therefrom to the flash chamber of stage B through line 59 in which chamber it is flashed and passed to chamber 48 of stage C through conduit 63. In the flash chamber of stage D, the liquor flowing thereto through line 64 is flashed and the remaining liquid flows to pump 65 through conduit 66 and is pumped to the cool waste sulphite liquor tank 21 through line 67.

The temperature of the waste sulphite liquor flowing through conduit 47 to flash chamber 48 of stage A would be at substantially 185° F. while the waste sulphite liquor flowing from condensers 50, 55 and 56 into flash chamber 48 through conduit 58 enters said flash chamber at approximately 160° F. The temperature of the waste sulphite liquor is progressively reduced by the flash chambers 48 of stages A, B, C, and D so that the temperature of the liquor leaving flash chamber 48 of stage D through conduit 66 and passing to the cool waste sulphite liquor tank 21 through line 67 is at substantially 100° F.

The vapor flashed off in flash chambers 48 flows to the condenser 50 of the stage with which the chamber is associated through a line 68 thereafter to be condensed in said condensers 50. The condensate from condenser 50 of stage A is passed to condenser 50 of stage B through conduit 69 wherein it is flashed and the condensate from condenser 50 of stage B flows to hot wash container 25 through line 70. Condensate produced in condenser 50 of stage C is passed to condenser 50 of stage D through conduit 71 and is flashed in the condenser of stage D. The condensate forming in condenser 50 of stage D is passed to hot water storage 35 through line 72. In this manner, the heat contained in the condensate is recovered and the $SO_2$ gas removed therefrom.

Steam line 15 is connected to each of the ejectors 51 of stages A, B, C, and D through steam conduits 73 and 74, steam conduit 73 being in communication with steam line 15 while conduit 74 is in communication with conduit 73. Ejector 51 of stage D receives steam from conduit 73 while the ejector of stages C, B, and A respectively, receive steam from conduit 74. The vapor removed from condenser 50 of stage D by ejector 51 flows through line 75 to condenser 50 of stage C wherein the condensibles are condensed and from which the vapor is withdrawn by ejector 51 for stage C. The vapors removed from the condenser for stage C by the ejector therefor are passed to condenser 50 of stage B wherein condensibles are condensed therefrom. Vapor withdrawn by ejector 51 of stage B flows to condenser 50 of stage A through line 77 and the condensible portion thereof is condensed in the condenser of stage A. The ejector of stage A discharges into condenser 55 through line 78. The non-condensibles from condenser 55, which comprises $SO_2$ gas, is conducted through conduit 78' to the sulphite acid container for the plant, not shown, while condensate from condenser 55 flows through line 79 to condenser 50 of stage A wherein it is flashed. In the present invention, the steam ejectors 51 of stages A, B, C, and D serve a double purpose in that they maintain a vacuum on the flash chambers 48 and condensers 50 of the stage with which they are associated and also build the pressure of $SO_2$ gas back to a desired amount, for example, one pound per square inch gage. The ejector steam is condensed from the $SO_2$ gas in the various condensers so that a water saturated $SO_2$ gas is released from the stripper evaporator through conduit 78'. It will be noted that in accordance with the method and apparatus of the present invention, the waste sulphite liquor flowing to storage tank 21 through line 67 is concentrated without the use of auxiliary heat or excessive heating surfaces and that the $SO_2$ gas is removed therefrom and reclaimed.

In accordance with the present invention, the waste sulphite liquid in storage 21 may be further concentrated and also dried. As shown in Fig. 2 of the drawings, waste sulphite liquor from storage tank 21 of Fig. 1 is conducted through a conduit 80 to preheating apparatus comprising, as shown, three preheaters 81, 82, and 83. The waste sulphite liquid in line 80 passes to a feed pump 84 which pumps the liquor into preheater 81 through line 85. From preheater 81, the liquor flows either to preheater 82 or to preheater 83 passing to preheater 82 through line 86 which is valved at 87 and 88 or to preheater 83 through line 86 and line 89 which is valved at 90. Heated waste sulphite liquor from preheater 82 passes into conduit 91 through valved line 92 while heated liquor from preheaters 83 flows into conduit 91 through valved line 93. From conduit 91, the preheated waste sulphite liquor passes into conduit 94 thence through a circulating pump 95, which places the liquor under pressure into a plurality of heaters 96 through a feed line 97 in which heaters the liquor is heated under pressure. Each of the heaters 96 receives feed from line 97 through valved connections 98 and discharges the heated waste sulphite liquor through valved outlet connections 99 into an outlet conduit 100. Heated waste sulphite liquor from the conduit 100 is passed to a steam converter 101. Converter 101 is under such lower pressure than the heaters that the waste sulphite liquor is flashed into steam some of which steam is condensed and the remainder of which is removed from the converter in a vaporous state.

As shown, steam from the converter 101 flows outwardly thereof and into steam line 15 through conduit 102. A portion of the steam in line 102 is passed through conduits 103 and 104 to preheaters 82 and 83. Steam enters preheater 83 through line 104 which line is valved adjacent the preheater while steam flows to preheater 82 through conduit 104 through connection 105 which connection is valved. It will be noted that the various steam connections and waste sulphite liquor connections to preheaters 82 and 83 are so valved that one of the heaters may be disconnected from the circuit and cleaned without interfering with the functioning of the other preheaters. Heaters 96 receive steam for the heating of the waste sulphite liquor flowing thereinto through lines 97 and 98 from a steam conduit 106 which receives steam from steam line 15, the steam from conduit 106 flowing into said preheaters through valved connections 107. Condensate from heaters 96 passes into a condensate line 108 through valved connections 109, said condensate thereafter passing to a secondary steam converter 110 which is under such pressure that part of the condensate flashes into steam. Steam from converter 101 also flows into steam converter 110 through lines 102 and 103 and, by heat interchange in secondary converter 110 flashes additional condensate from heaters 96 entering said converter through line 108 into steam. The remaining condensate is returned from converter 110 through line 129 to steam generator 14. Condensate from the preheaters 82, and 83 flow through valved connections 111 into condensate line 112 which is connected to receive condensate from secondary steam converter 110 and connects with a conduit 113 conducting condensate from preheater 81 to a flash chamber 114.

In operation, the waste sulphite liquor flowing into feed pump 84 through conduit 80 is brought up to the operating pressure of steam converter 101 and passed into preheater 81 through line 85. From preheater 81, the waste sulphite liquor is conducted to either or both of the preheaters 82 or 83, and after heating therein is conducted to the heaters 96 through either or both lines 92 and 93 into line 91 and from line 91 through conduit 94, circulating pump 95, and line 97. From line 97, the preheated waste sulphite liquor is conducted to any one or all of the heaters 96 through connections 98. After heating in the heaters 96, the waste sulphite liquor is passed into lines 100 through outlet connections 99 thence into the steam converter 101. It will be noted, that the inlet connections 98 and the outlet connections 99 are so valved that any one or all of the heaters may be used and various heaters may be removed from the line for cleaning as desired. Preheating in the preheaters 81, 82 and 83 and the heating in heaters 96 is done under pressure to avoid steaming in the waste sulphite liquor so as to reduce the scaling on the preheater and heater surfaces. As shown, the liquid level in steam converter 101 is controlled by capacity control valve 116 in line 91 while the pressure in said steam converter is controlled by pressure control valve 115 in line 100.

After removal of vapor therefrom in converter 101, a portion of the waste sulphite liquor of the desired concentration is withdrawn from the bottom of steam converter 101 through outlet conduit 117 controlled by a specific gravity control valve 118 which controls the specific gravity of liquor flowing through outlet line 117. Another portion of the waste sulphite liquor of the desired concentration flows from the steam converter 101 through line 94, in which it is diluted by waste sulphite liquor entering said line through conduit 91, and is thereafter pumped by circulating pump 95 into the heaters 96. The flashing of the waste sulphite liquor in steam converter 101 provides calcium sulphate crystals which have surfaces sufficiently large that the scaling of heaters 96 by said liquor passing thereinto through lines 94, 97 and 98 will be reduced. These crystals will have a gentle scouring action to remove any scale adhering to the tubes and will prevent super-saturation of calcium sulphate in the heater tubes by offering a surface on which the calcium sulphate will tend to first crystallize and will prevent super-saturation of calcium sulphate in the steam converter 101.

Concentrated waste sulphite liquor flowing from steam converter 101 through line 117 is passed to a dryer 119. As shown in Fig. 2, the dryer 119 comprises a rotating drum 120 across the face of which an even film of concentrated waste sulphite liquor from line 117 is distributed by distributor 121. Steam from steam converter 101 flowing through lines 102 and 103 pass into the drum 120 so as to heat the outer periphery thereof through line 122. The heat of the steam is such that the film of concentrated waste sulphite liquor will be dried into solid form in one revolution of the drum and the dry solids will thereafter be removed from said surface by a scraper or other desirable means. The dried solids which comprises finely divided dry crystals somewhat similar to pulverized coal are removed from the dryer by a screw conveyer or rotary air-lock, not shown, and passed into line 122', which, as shown, is connected to burners of steam generator 14. The dryer 119 is so enclosed that the vapor released from the waste sulphite liquor in drying may be conducted through a pipe 123 to preheater 81 and thereby used to preheat waste sulphite liquor flowing into said heater. The condensate from the dryer 119 passes into pipe 123 through line 124, and together with the condensate from heater 81, flows through line 113 into flash chamber 114. The steam from flash chamber 114 flows into condenser 56 (Fig. 1) through conduit 125 while the condensate from said flash chamber is pumped by pump 126 through line 127 into condenser 56. The condensate from condenser 56 flows from condensate line 128 into line 79 which, as heretofore described, extends between condenser 55 and condenser 56 of stage A.

As shown in Fig. 2, steam from steam converter 101 passes through lines 102 and 103 into secondary steam converter 110 from which converter condensate passes into preheaters 82 and 83 through line 112 as hereinbefore described. Condensate from converter 110 also flows to the steam generator 14 through conduit 129. Steam from secondary converter 110 is passed to steam consumers such as paper machines through steam conduit 130.

The waste sulphite liquor from storage 21 may be dried by means of drying apparatus other than the drum dryer 119 of Fig. 2. As shown in Fig. 3, waste sulphite liquor from storage tank 21 flows into the suction side of feed pump 84 through line 80 and is fed by said pump through line 85 into a preheater 81'. From preheater 81', the heated waste sulphite liquor is passed through conduit 131 to preheater 132 where it is further heated prior to passage thereof through line 133 into the upper part of a scrubbing tower 134. The scrubbing tower is used to scrub gases entering the lower part thereof by passing the gases which flow upwardly in the tower countercurrent to and in contact with the heated waste sulphite liquor which passes downwardly in the tower. The scrubbed gases are vented through a vent pipe 135 while the waste sulphite liquor, after use in scrubbing gases, is pumped from the lower portion of tower 134 by pump 136 through line 137 into preheater 81. Preheaters 81, 82 and 83 are arranged slightly differently than in Fig. 2 inasmuch as the waste sulphite liquor is heated by the passage thereof serially through the heaters. That is, from the preheater 81, heated waste sulphite liquor passes to heater 82 through line 86 and after the heating thereof in preheater 82 is passed to preheater 83 through line 92. Waste sulphite liquor heated in the heaters 81, 82 and 83 is then passed from heater 83 into line 93 thence into conduit 91. The heating medium for preheaters 81, 81', 82, and 83 is condensate from secondary steam converter 110 which condensate is passed through the heaters serially and enters preheater 83 through condensate line 112. Condensate after use in heater 83 is passed to heater 82 through line 92' and after use in preheater 82 is passed to preheater 81 through line 86'. The condensate from preheater 81 is conducted to preheater 81' through conduit 138 and after use in preheater 81' is conducted through line 111 to hot wash tank 25 (Fig. 1).

The waste sulphite liquor in conduit 91 flows into conduit 94 and is pumped by pump 95 into line 97 whence it passes into heaters 96, as hereinbefore described in the description of the embodiment of the invention shown in Fig. 2. After heating in heaters 96, the waste sulphite liquor is passed through outlet conduit 100 to the steam converter 101 which converter is under such pressure that the waste sulphite liquor is flashed into steam some of which is condensed and the remainder of which is removed from the converter as vapor. The operation of the converter is the same as in the embodiment of the invention shown in Fig. 2. The steam, however, passes upwardly from the converter through lines 102, and 103 into secondary steam converter 110 while waste sulphite liquor of the desired concentration is withdrawn from the bottom of steam converter 101 through outlet conduit 117 controlled by a specific gravity control valve 118 and is introduced into a flash tank 139. In the flash tank 139, the waste sulphite liquor is further concentrated by the removal of steam therefrom, the steam flowing from the flash tank through conduit 140 into preheater 132 wherein it is used to heat the waste sulphite liquor flowing to scrubbing tower 134 through lines 131 and 133. The condensate from preheater 132 flows into condensate line 138 between preheaters 81 and 81' through conduit 141. Concentrated waste sulphite liquor from flash tank 139 passes into a spray dryer 142 through outlet conduit 143, conduit 143 being connected to rotary spray head or atomizer 144 revolved at a high speed by a motor 145. The spray from atomizer 144 is dried by flue gases from steam generator 14 which is conducted to the dryer 142 through flue 14'. By drying the waste sulphite liquor in the spray dryer, calcium sulphate solids somewhat similar to pulverized coal are formed, which solids are removed from the drying gases by cyclones 146 in the dryer 142. The solids after separation from gases pass downwardly and outwardly of the dryer through outlet pipe 147, controlled by an air-lock 148, and into a fuel feed pipe 149. The solids are carried through feed pipe 149 into a steam boiler 14 through a burner 150 in an air stream provided by fan 151.

Gases separated from solids by the cyclones in dryer 142 are removed by a fan 152 which withdraws said gases from the dryer through outlet pipe 153 and introduces said gases into scrubbing tower 134 through gas inlet 154. As hereinbefore set forth, the gases are scrubbed in tower 134 by passing them countercurrent to and in contact with the waste sulphite liquor flowing into the top of the tower through line 153 and downwardly in the scrubber.

While it is highly desirable to flow waste sulphite liquor from accumulator 38 through the multiple stripper evaporators as hereinbefore described, it is possible to obtain a dried solid by conducting hot waste sulphite liquor from accumulator 38 to steam converter 101 of Figs. 2 and 3 through conduit 200 indicated by dot and dash lines in Figs. 1, 2, 3 and 7. Concentrated waste sulphite liquor so conducted to converter 101 would thereafter be dried as hereinbefore set forth in the description of Figs. 2 and 3.

So that the waste sulphite liquor flowing from the preheaters to heaters 96 through lines 91 and 94 in Figs. 2 and 3 and thence to converter 101 through line 100 may have a high solution of calcium sulphate therein, it may be desirable to precipitate said calcium sulphate by treating the preheated waste sulphite thereby minimizing or preventing formation of scale in the heaters 96 and in the converter 101. In the embodiment of the invention illustrated in Fig. 4, the waste sulphite liquor flowing from the preheaters, only two of which are shown in Fig. 4, is passed into a treatment tank 155 through line 91. In the treatment tank 155, the waste sulphite liquor is treated by steam which is introduced into said tank through steam line 156 which receives live steam from steam line 15 through conduit 106. Treatment by steam in tank 155 precipitates the calcium sulphate in the waste sulphite liquor prior to the passage of said liquor from tank 155 into line 91' thence into conduit 94. Scaling of the heaters 96, only one of which is shown in Fig. 4, is thereby greatly minimized or prevented.

The form of the invention shown in Fig. 5 is somewhat similar to that shown in Fig. 4, but a further treatment tank is positioned in the line leading from heaters 96 to converter 101. A treatment tank 157 is positioned in outlet conduit 100 so that heated waste sulphite liquor from heater or heaters 96 flows into said treatment tank which is similar to treatment tank 155. Steam for precipitating calcium sulphate in the waste sulphite liquor delivered in tank 157 through line 100 is received by said tank from steam line 15 through lines 106 and 158. After calcium sulphate is precipitated from the waste sulphite liquor in tank 157, the liquor is passed into the upper portion of steam converter 101 through line 100'.

Figure 6:
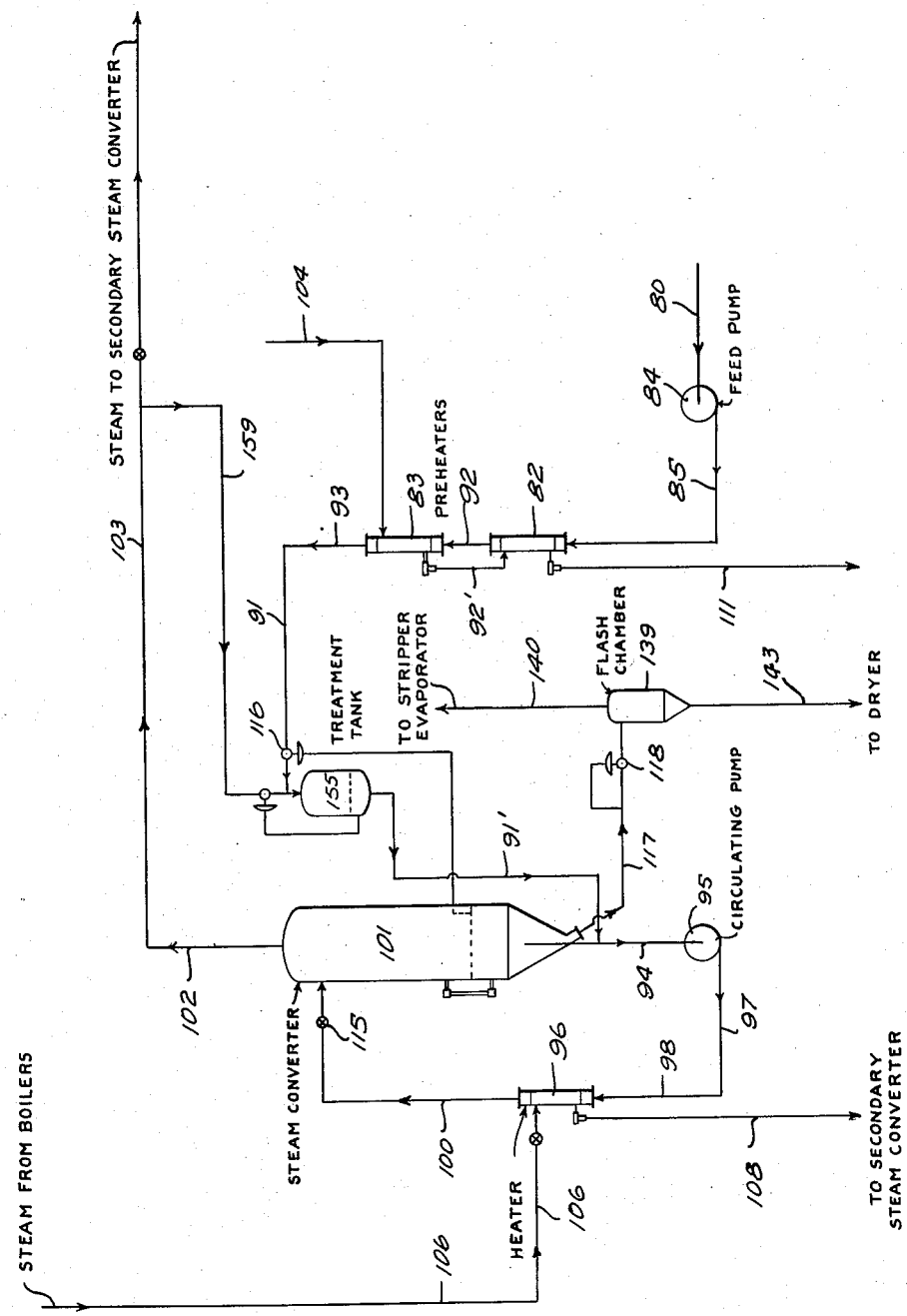
Fig. 6 is a view similar to Figs. 4 and 5 but of a further embodiment of the invention.

In the embodiment of the invention shown in Fig. 6, waste sulphite liquor flowing from the preheaters to the heaters 96 through lines 91', 94, 97 and 98 is treated by steam from steam converter 101 to precipitate the calcium sulphate in said liquor. As shown, steam which passes from steam converter 101 through conduit 102 flows to secondary steam converter 110 through line 103 as hereinbefore set forth in the description of the embodiment of the invention shown in Fig. 2. Some of the steam from line 103 is passed through conduit 159 (Fig. 6) to treatment tank 155 wherein it is used to precipitate the calcium sulphate in the waste liquor passed into said treatment tank through line 91. After treatment, the waste sulphite liquor is passed through lines 91', 94 and pump 95, thence through lines 97 and 98 into heater 96, as set forth in the description relating to the embodiment of the invention shown in Fig. 4. In this manner, scaling of the heaters 96, only one of which is shown in Fig. 6, is prevented.

The waste sulphite liquor in tank 21 may also be used for the production of alcohol as well as fuel. In the embodiment of the invention shown in Fig. 7, cooled waste sulphite liquor from tank 21 is passed to alcohol fermenter 160 wherein fermentation is carried out in the usual way with a suitable distilling yeast. Nutrients necessary for supporting of the yeast is also supplied. After fermentation, the fermented waste sulphite liquor flows through conduit 80' into suction feed pump 84 thereafter to be discharged from said pump into preheater 81 through conduit 85. After becoming heated in preheater 81, the fluid is passed through line 86 to preheater 82 wherein it is further heated and thereafter passed through conduit 92 into preheater 83. Heated fluid from preheater 83 flows into conduit 91 and passes into steam converter 101 which is similar to the converter shown in Figs. 1 to 6.

In converter 101, the fluid is vaporized, a portion of the vapor passing outwardly of the converter through lines 102 and 103 while another portion thereof is condensed. A part of the condensed portion passes outwardly thereof through conduit 94 and is pumped by pump 95 through conduits 97 and 98 into heaters 96, as set forth in the description relating to the embodiment of the invention shown in Fig. 2, the heated fluid flowing from the heaters 96 into converter 101 through line 100. As in the form of the invention shown in Fig. 2, a concentrated portion of the condensed fluid from converter 101 flows through line 117 into drum-type dryer 119.

The vapor flowing outwardly of converter 101 through lines 102 and 103 passes into the lower portion of a rectifying column 161, a portion of said vapor being conducted to dryer 119 through line 122 for use as a heating medium in the dryer. Condensate formed in dryer 119 is pumped therefrom by pump 124' through line 124 which discharges it into conduit 162. Conduit 162, in turn, discharges the condensate into the upper part of rectifying column 161. In rectifying column 161, the condensate flows downwardly through vapor and liquid contacting devices 161' passing countercurrent to and in contact with the vapor discharged into the lower part of said column through line 103. Vapor from the rectifying column 161 flows outwardly thereof through vapor conduit 163 and into secondary steam converter 110. A part of the condensate formed in secondary steam converter 110 passes therefrom into line 112 and is discharged into the upper part of rectifying column 161 wherein said condensate passes downwardly countercurrent to and in contact with the vapor passing upwardly within the column. The remainder of the condensate from converter 110 flows through conduit 129 to the boiler 14.

Vapor from secondary steam converter 110 passes through vapor conduit 164 into the lower portion of another rectifying column 165. In rectifying column 165 said vapor flows upwardly through vapor and liquid contact devices 165' within the column countercurrent to and in contact with condensate which enters the upper part of column 165 through line 166 which line receives said condensate from preheater 81. Waste sulphite fluid from fermenter 160 which enters preheater 81 through line 85 is heated in said preheater by vapor from rectifying column 165 flowing thereinto through conduit 175. The condensate from the vapor flows from said preheater through line 166 and is returned to said column as hereinbefore described. Alcohol is withdrawn from column 165 through conduit 167 and fusel oil is removed from the column through conduit 168. Condensate is pumped from the lower part of column 165 by pump 169 which receives said condensate through pipe 170 connected at one end thereof to the bottom of said column and at the other end to the suction of said pump. Pump 169 provides pressure to pump the condensate from column 165 to the upper part of rectifying column 161 through conduit 171, said condensate theerafter passing downwardly in the column countercurrent to and in contact with the vapor flowing upwardly therein.

Preheater 83 is heated by condensate which it receives through line 172 connected to said preheater and the lower part of rectifying column 161. The condensate from said preheater is discharged therefrom through line 173 into flash chamber 114 which is similar to flash chamber 114 of Fig. 2. Preheater 82 receives vapor from dryer 119 through line 123, the condensate from preheater 82 being discharged into line 173 through pipe 174 and vapor from said preheater being discharged into steam outlet conduit 125 from flash chamber 114. The steam outlet conduit from flash chamber 114, as in the form of the invention shown in Fig. 2, discharges into condenser 56 of Fig. 1, while condensate from flash chamber 114 is passed through line 127 by pump 126 into condenser 56.

With the embodiment of the invention shown in Fig. 7, alcohol distillation from waste sulphite liquor removed from a mixture received from a digester and concentrated, as shown in Fig. 1 and dried as illustrated in Fig. 2, is accomplished without the necessity of using extra steam for distillation. This results in a more efficient use of steam and a great reduction in the steam cost for distillation.

It will be apparent that various modifications may be made in the form of the apparatus herein disclosed and in the steps of the process herein described without departing from the spirit of the invention which is not to be limited excepting by the scope of the appended claims.

What is claimed is:

1. In a sulphite pulp plant comprising a steam generator, steam conduit means for conducting steam from the steam generator, a digester adapted to receive a fibrous substance, sulphite cooking liquor and steam from the steam generator, means for blowing-down said digester, separating means adapted to separate fibrous substance and cooking liquor, means for conducting the mixture blown-down from the digester to the separating means, a plurality of evaporators each having an evaporating zone, concentrate conduit means for connecting said evaporators in series so that concentrate is conducted from one evaporator to the evaporating zone of the next succeeding evaporator, a condenser communicating with each evaporator so as to receive condensible medium therefrom, said condensers being adapted for the passage of a condensing medium and a condensible medium in indirect heat exchange relationship with one another, means connecting said condensers in series so as to conduct condensing medium after passage thereof in said heat exchange relationship with said condensible medium in one condenser from the one condenser to the next succeeding condenser, vacuum producing means cooperating with each of the evaporators and condensers to maintain the same under vacuum and evaporate the liquor conducted to said evaporators, waste sulphite liquor conducting means in communication with said separating means so as to receive separated liquor therefrom and in communication with the evaporating zone of the first of a series of evaporators to conduct said liquor thereto, concentrate receiving means, means in communication with the last of said series of evaporators and with the concentrate receiving means, concentrate conducting means in communication with the concentrate receiving means and the first of a series of said condensers so as to conduct the concentrate to said first condenser for use as a condensing medium therein, and a used concentrate conduit in communication with the last of said series of evaporators and the first of said series of evaporators so as to receive said used concentrate after use thereof as a condensing medium in said last condenser and to conduct it to the evaporating zone of said first evaporator.

2. In a suplhite pulp plant comprising a steam generator, steam conduit means for conducting steam from the steam generator, a digester adapted to receive a fibrous substance, sulphite cooking liquor and steam from the steam generator, means for blowing-down said digester, washing means adapted to wash fibrous substance from cooking liquor, means for conducting the mixture blown-down from the digester to the washing means, a plurality of evaporators each having an evaporating zone, concentrate conduit means for connecting said evaporators in series so that concentrate is conducted from one evaporator to the evaporating zone of the next succeeding evaporator, a condenser communicating with each evaporator so as to receive condensible medium therefrom, said condensers being adapted for the passage of a condensing medium and a condensible medium in indirect heat exchange relationship with one another, means connecting said condensers in series so as to conduct condensing medium after passage thereof in said heat exchange relationship with said condensible medium in one condenser from the one condenser to the next condenser, vacuum producing means cooperating with each of the evaporators and condensers to maintain the same under vacuum and evaporate the liquor conducted to said evaporators, waste sulphite liquor conducting means in communication with said washing means so as to receive separated liquor therefrom and in communication with the evaporating zone of the first of a series of evaporators to conduct said liquor thereto, concentrate receiving means, means in communication with the last of said series of evaporators and with the concentrate receiving means, concentrate conducting means in communication with the concentrate receiving means and the first of a series of said condensers so as to conduct the concentrate to said first condenser for use as a condensing medium therein, condensate conducting means in communication with the condensers and with washing means so as to conduct said condensate from the condensers to the washing means, and a used concentrate conduit in communication with the last of said series of condensers and the first of said series of evaporators so as to receive said used concentrate after use thereof as a condensing medium in said last condenser and to conduct it to the evaporating zone of said first evaporator.

3. In a sulphite pulp plant comprising a steam generator, steam conduit means for conducting steam from the steam generator, a digester adapted to receive a fibrous substance, sulphite cooking liquor and steam from the steam generator, means for blowing-down said digester, a blow-down receiver in communication with the digester to receive a mixture of fibrous material and cooking liquor therefrom, an absorber so arranged that a gas and a liquid are passed in contact with one another, a gas line in communication with the absorber and with the digester blow-down receiver to receive gases therefrom, absorbing liquid conduit means in communication with the absorber and with said blow-down receiver so as to conduct liquid from the absorber to said receiver, washing means adapted to wash fibrous substance from cooking liquor, means for conducting said mixture from the blow-down receiver to the washing means, a plurality of evaporators each having an evaporating zone, concentrate conduit means for connecting said evaporators in series so that concentrate is conducted from one evaporator to the evaporating zone of the next succeeding evaporator, a condenser communicating with each evaporator so as to receive condensible medium therefrom, said condensers being adapted for the passage of a condensing medium and a condensible medium in indirect heat exchange relationship with one another, means connecting said condensers in series so as to conduct condensing medium after passage thereof in said heat exchange relationship with said condensible medium in one condenser to the next succeeding condenser from the one condenser to the next succeeding condenser, vacuum producing means cooperating with each of the evaporators and condensers to maintain the same under vacuum and evaporate the liquor conducted to said evaporators, waste sulphite liquor conducting means in communication with said washing means so as to receive separated liquor therefrom and in communication with the evaporating zone of the first of a series of evaporators to conduct said liquor thereto, concentrate receiving means, means in communication with the last of said series of evaporators and with the concentrate receiving means, concentrate conducting means in communication with the concentrate receiving means and the first of a series of said condensers so as to conduct the concentrate to said first condenser for use as a condensing medium therein, other concentrate conducting means in communication with said concentrate receiving means and with the absorber so as to conduct concentrate to said absorber, condensate conducting means in communication with the condensers and with said washing means so as to conduct said condensate from the condensers to the washing means, and a used concentrate conduit in communication with the last of said series of condensers and the first of said series of evaporators so as to receive said used concentrate after use thereof as a condensing medium in said last condenser and to conduct it to the evaporating zone of said first evaporator.

4. In a sulphite pulp plant comprising a steam generator, steam conduit means for conducting steam from the steam generator, a digester adapted to receive a fibrous substance, sulphite cooking liquor and steam from the steam generator, means for blowing-down said digester, a blow-down receiver in communication with the digester to receive a mixture of fibrous material and cooking liquor therefrom, a blow-down vapor condenser in communication with the blow-down receiver so as to receive vapor therefrom, said blow-down vapor condenser being adapted to receive a condensing medium and a condensible medium for passage in indirect heat exchange relationship with one another, an absorber so arranged that a gas and a liquid are passed in contact with one another, a gas line in communication with the absorber and with said blow-down vapor condenser so as to receive uncondensed vapor therefrom, absorbing liquid conduit means in communication with the absorber and with said blow-down receiver so as to conduct liquid from the absorber to said receiver, separating means adapted to separate fibrous substance from cooking liquor, means for conducting said mixture from blow-down receiver to the separating means, a plurality of evaporators each having an evaporating zone, concentrate conduit means for connecting said evaporators in series so that concentrate is conducted from one evaporator to the evaporating zone of the next succeeding evaporator, a condenser in communication with each evaporator so as to receive condensible medium therefrom, said last-mentioned condensers being adapted for the passage of a condensing medium and a condensible medium in indirect heat exchange relationship with one another, means connecting said last-mentioned condensers in series so as to conduct condensing medium after passage thereof in heat exchange relationship with said condensible medium in one of the last-mentioned condensers from said one condenser to the next succeeding condenser, vacuum producing means cooperating with each of the evaporators and condensers to maintain the same under vacuum and evaporate the liquor conducted to said evaporators, waste sulphite liquor conducting means in communication with said separating means so as to receive separated liquor therefrom and in communication with the evaporating zone of the first of a series of evaporators to conduct said liquor thereto, concentrate receiving means, means in communication with the last of said series of evaporators and with the concentrate receiving means, concentrate conducting means in communication with the concentrate receiving means and the first of said last-mentioned condensers so as to conduct the concentrate to said first condenser as a condensing medium therein, other concentrate conducting means in communication with said concentrate receiving means and with the blow-down vapor condenser, a connection between said blow-down vapor condenser and said absorber arranged to conduct concentrate used as a condensing medium in said blow-down vapor condenser to the absorber for use as absorbing liquid therein, a condensate line in communication with the blow-down condenser and with said separating means to conduct condensate from the blow-down condenser to the separating means for use as a separating fluid therein, and a used concentrate conduit in communication with the last of the aforesaid last-mentioned condensers and the first of said plurality of evaporators so as to receive said used concentrate after use thereof as a condensing medium in said last condenser and to conduct it to the evaporating zone of said first evaporator.

5. In a sulphite pulp plant comprising a steam generator, steam conduit means for conducting steam from the steam generator, a digester adapted to receive a fibrous substance, sulphite cooking liquor and steam from the steam generator, means for blowing-down said digester, separating means adapted to wash fibrous substance from cooking liquor, means for conducting the mixture blown-down from the digester to the washing means, a plurality of evaporators each having an evaporating zone, concentrate conduit means for connecting said evaporators in series so that concentrate is conducted from one evaporator to the evaporating zone of the next succeeding evaporator, a condenser in communication with each evaporator so as to receive condensible medium therefrom, said condensers being adapted for the passage of a condensing medium and a condensible medium in indirect heat exchange relationship with one another, means connecting said condensers in series so as to conduct condensing medium after passage thereof in said heat exchange relationship with said condensible medium in one condenser from the one condenser to the next succeeding condenser, vacuum producing means comprising a steam jet cooperating with each of the evaporators and condensers to maintain the same under vacuum and evaporate the liquor conducted to said evaporators, a live steam line communicating with said steam conduit means and with the steam jets, discharge steam lines connected to each of said steam jets and with condensers of said series of condensers to conduct steam discharged from the steam jets to said condensers, condensed steam lines communicating with the condensers and with said separating means to conduct condensed steam from the ejectors and condensed vapor from the evaporators to said separating means for use therein, waste sulphite liquor conducting means in communication with said separating means so as to receive separated liquor therefrom and in communication with the evaporating zone of the first of said plurality of evaporators to conduct said liquor thereto, concentrate receiving means, means in communication with the last of said plurality of evaporators and with the concentrate receiving means, concentrate conducting means in communication with the concentrate receiving means and the first of a series of said condensers so as to conduct the concentrate to said first condenser for use as a condensing medium therein, and a used concentrate conduit in communication with the last of said series of condensers and the first of said series of evaporators so as to receive said used concentrate after use thereof as a condensing medium in said last condenser and to conduct it to the evaporating zone of said first evaporator.

6. In a sulphite pulp plant comprising a steam generator, steam conduit means for conducting steam from the steam generator, a digester adapted to receive a fibrous substance, sulphite cooking liquor and steam from the steam generator, means for blowing-down said digester, a blow-down receiver in communication with the digester to receive a mixture of fibrous material and cooking liquor therefrom, a blow-down vapor condenser in communication with the blow-down receiver so as to receive vapor therefrom, said blow-down vapor condenser being adapted to receive a condensing medium and a condensible medium for passage in indirect heat exchange relationship with one another, an absorber so arranged that a gas and a liquid are passed in contact with one another, a gas line in communication with the absorber and with said blow-down condenser so as to receive uncondensed vapor therefrom, absorbing liquid conduit means in communication with the absorber and with said blow-down receiver so as to conduct liquid from the absorber to said receiver, washing means adapted to wash fibrous substance from cooking liquor, means for conducting said mixture from the blow-down receiver to the washing means, a plurality of evaporators each having an evaporating zone, concentrate conduit means for connecting said evaporators in series so that concentrate is conducted from one evaporator to the evaporating zone of the next succeeding evaporator, a condenser in communication with each evaporator so as to receive condensible medium therefrom, said last mentioned condensers being adapted for the passage of a condensing medium and a condensible medium in indirect heat exchange relationship with one another, means connecting said last-mentioned condensers in series so as to conduct condensing medium after passage thereof in heat exchange relationship with said condensible medium in one of the last-mentioned condensers from said one condenser to the next succeeding condenser, vacuum producing means comprising a steam jet cooperating with each of the evaporators and condensers to maintain the same under vacuum and evaporate the liquor conducted to said evaporators, a live steam line communicating with said steam conduit means and with the steam jets, discharge steam lines connected to each of said steam jets and with condensers of said series of condensers to conduct steam discharged from the steam jets to said condensers, condensed steam lines communicating with the condensers and with said washing means to conduct condensed steam from the ejectors and condensed vapor from the evaporators to said washing means for use therein, waste sulphite liquor conducting means in communication with said washing means so as to receive separated liquor therefrom and in communication with the evaporating zone of the first of a series of evaporators to conduct said liquor thereto, concentrate receiving means, means in communication with the last of said series of evaporators and with the concentrate receiving means, concentrate conducting means in communication with the concentrate receiving means and the first of said last-mentioned condensers so as to conduct the condensate to said first condenser as a condensing medium therein, other concentrate conducting means in communication with said concentrate receiving means and with the blow-down vapor condenser, a connection between said blow-down vapor condenser and said absorber arranged to conduct concentrate used as a condensing medium in said blow-down vapor condenser to the absorber for use as absorbing liquid therein, a condensate line in communication with the blow-down condenser and with said washing means to conduct condensate from the blow-down condenser to the washing means for use as a wash fluid therein, and a used concentrate conduit in communication with the last of the aforesaid last-mentioned condensers and the first of said plurality of evaporators so as to receive said used concentrate after use thereof as a condensing melium in said last condenser and to conduct it to the evaporating zone of said first evaporator 7. In a sulphite pulp plant comprising a digester adapted to receive a fibrous substance, sulphite cooking liquor and steam, means for blowing down said digester, separating means adapted to separate fibrous substance and cooking liquor, means for conducting the mixture blown-down from the digester to the separating means, a plurality of evaporators each having an evaporating zone, concentrate conduit means for connecting said evaporate in series so that concentrate is conducted from one evaporator to the evaporating zone of the next succeeding evaporator, a condenser communicating with each evaporator so as to receive condensible medium therefrom, said condenser being adapted for the passage of a condensing medium and a condensible medium in indirect heat exchange relationship with one another, vacuum producing means cooperating with each of the evaporators and condensers to maintain the same under vacuum and evaporate the liquor conducted to said evaporators, waste sulphite liquor conducting means in communication with said separating means so as to receive separated liquor therefrom and in communication with the evaporating zone of the first of a series of evaporators to conduct said liquor thereto, concentrate receiving means, means in communication with the last of said series of evaporators and with the cencentrate receiving means to conduct concentrate from said last evaporator to the receiving means, concentrate conducting means in communication with the concentrate receiving means and said condensers so as to conduct concentrate to said condensers for use as a condensing medium, and a used concentrate conduit in communication with the first of said series of evaporators and with the condensers so as to receive concentrate from said condensers after use as a condensing medium and conduct it to said first of the series of evaporators so as to receive said used concentrate after use thereof as a condensing medium in the condensers and to conduct it to the evaporating zone of said first evaporator.

8. In a sulphite pulp plant comprising a digester adapted to receive a fibrous substance, sulphite cooking liquor and steam, means for blowing down said digester, a blow-down receiver in communication with the digester to receive a mixture of fibrous material and cooking liquor therefrom, an absorber so arranged that a gas and a liquid are passed in contact with one another, a gas line in communication with the absorber and with the digester blow-down receiver to receive gases therefrom, absorbing liquid conduit means in communication with the absorber and with said blow-down receiver so as to conduct liquid from the absorber to said receiver, separating means adapted to separate fibrous substance and cooking liquor, means for conducting said mixture from the blow-down receiver to the separating means, a plurality of evaporators each having an evaporating zone, concentrate conduit means for connecting said evaporators in series so that concentrate is conducted from one evaporator to the evaporating zone of the next succeeding evaporator, a condenser communicating with each evaporator so as to receive condensible medium therefrom, said condensers being adapted for the passage of a condensing medium and a condensible medium in indirect heat exchange relationship with one another, vacuum producing means cooperating with each of the evaporators and condensers to maintain the same under vacuum and evaporate the liquor conducted to said evaporators, waste sulphite liquor conducting means in communication with said separating means so as to receive separated liquor therefrom and in communication with the evaporating zone of the first of a series of evaporators to conduct said liquor thereto, concentrate receiving means, means in communication with the last of said series of evaporators and with the concentrate receiving means to conduct concentrate from said last evaporator to the receiving means, concentrate conducting means in communication with the concentrate receiving means and said condensers so as to conduct concentrate to said condensers for use as a condensing medium, other concentrate conducting means in communication with said concentrate receiving means and with the absorber so as to conduct concentrate to said absorber, condensate conducting means in communication with the condensers and with said separating means so as to conduct said condensate from the condensers to the separating means, and a used concentrate conduit in communication with the first of said series of evaporators and with the condensers so as to receive concentrate from said condensers after use as a condensing medium and conduct it to said first of the series of evaporators so as to receive said used concentrate after use thereof as a condensing medium in the condensers and to conduct it to the evaporating zone of said first evaporator.

9. In a sulphite pulp plant comprising a digester adapted to receive a fibrous substance, sulphite cooking liquor and steam, means for blowing down said digester, a blow-down receiver in communication with the digester to receive a mixture of fibrous material and cooking liquor therefrom, a blow-down vapor condenser in communication with the blow-down receiver so as to receive vapor therefrom, said blow-down vapor condenser being adapted to receive a condensing medium and a condensible medium for passage in indirect heat exchange relationship with one another, an absorber so arranged that a gas and a liquid are passed in contact with one another, a gas line in communication with the absorber and with said blow-down vapor condenser so as to receive uncondensed vapor therefrom, absorbing liquid conduit means in communication with the absorber and with said blow-down receiver so as to conduct liquid from the absorber to said receiver, separating means adapted to separate fibrous substance and cooking liquor, means for conducting said mixture from the blow-down receiver to the separating means, a plurality of evaporators each having an evaporating zone, concentrate conduit means for connecting said evaporators in series so that concentrate is conducted from one evaporator to the next evaporating zone of the succeeding evaporator, a condenser communicating with each evaporator so as to receive condensible medium therefrom, said last-mentioned condensers being adapted for the passage of a condensing medium and a condensible medium in indirect heat exchange relationship with one another, vacuum producing means cooperating with each of the evaporators and condensers to maintain the same under vacuum and evaporate the liquor conducted to said evaporators, waste sulphite liquor conducting means in communication with said separating means so as to receive separated liquor therefrom and in communication with the evaporating zone of the first of a series of evaporators to conduct said liquor thereto, concentrate receiving means, means in communication with the last of said series of evaporators and with the concentrate receiving means to conduct concentrate from said last evaporator to the receiving means, concentrate conducting means in communication with the concentrate receiving means and said condensers so as to conduct concentrate to said condensers for use as a condensing medium, other concentrate conducting means in communication with said concentrate receiving means and with the blow-down vapor condenser, a connection between said blow-down vapor condenser and said absorber arranged to conduct concentrate used as a condensing medium in said blow-down vapor condenser to the absorber for use as absorbing liquid therein, a condensate line in communication with the blow-down condenser and with said separating means to conduct condensate from the condenser to the separating means for use as a separating fluid therein, and a used concentrate conduit in communication with the first of said series of evaporators and with the condensers so as to receive concentrate from said condensers after use as a condensing medium and conduct it to said first of the series of evaporators so as to receive said used concentrate after use thereof as a condensing medium in the condensers and to conduct it to the evaporating zone of said first evaporators.

References Cited in the file of this patent

UNITED STATES PATENTS

| Number | Name | Date |
|---|---|---|
| 1,103,216 | Moore et al. | July 14, 1914 |
| 1,263,486 | Thorne | Apr. 23, 1918 |
| 1,308,184 | McAfee | July 1, 1919 |
| 1,469,958 | Richter | Oct. 9, 1923 |
| 1,864,619 | Richter | June 28, 1932 |
| 2,025,891 | Paulson | Dec. 31, 1935 |
| 2,108,567 | Scholler et al. | Feb. 15, 1938 |
| 2,197,059 | Seidel | Apr. 16, 1940 |
| 2,238,456 | Tomlinson | Apr. 15, 1941 |
| 2,352,304 | Young | June 27, 1944 |
| 2,385,955 | Tomlinson | Oct. 2, 1945 |

OTHER REFERENCES

Technical Association Papers, Series 16, pages 198–200, 1933; and Series 19, pages 285–292, 1936.

Pulp and Paper Mag. of Canada, vol. 50, October 1949, pp. 114–121.